J. Tyler,

Water Wheel,

No. 3,018. Reissued June 30, 1868.

N. PETERS, PHOTO-LITHOGRAPHER, WASHINGTON, D. C.

United States Patent Office.

JOHN TYLER, OF WEST LEBANON, NEW HAMPSHIRE

*Letters Patent No.* 20,456, *dated June* 1, 1858; *reissue No.* 3,018, *dated June* 30, 1868.

IMPROVEMENT IN WATER-WHEELS.

The Schedule referred to in these Letters Patent and making part of the same.

TO ALL WHOM IT MAY CONCERN:

Be it known that I, JOHN TYLER, of West Lebanon, in the county of Grafton, and State of New Hampshire, have invented a new and useful Improvement in Water-Wheels; and I do hereby declare that the following is a full and exact description thereof, reference being had to the accompanying drawings, which form a portion of this specification—

Figure 1:
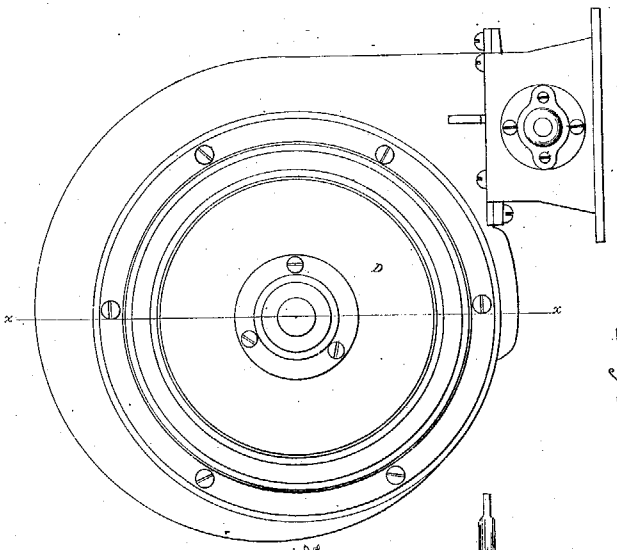

Figure 1 being a top view of my improved water-wheel.

Figure 2:
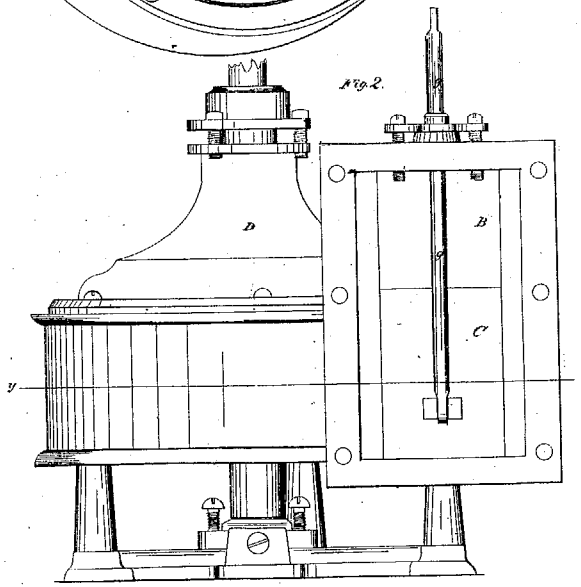

Figure 2 a side elevation of the same.

Figure 3:
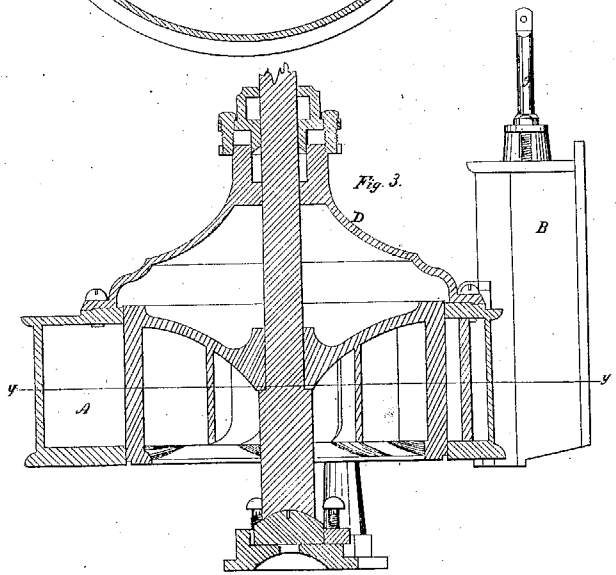

Figure 3 a vertical section in the line *x x* of fig. 1, and

Figure 4:
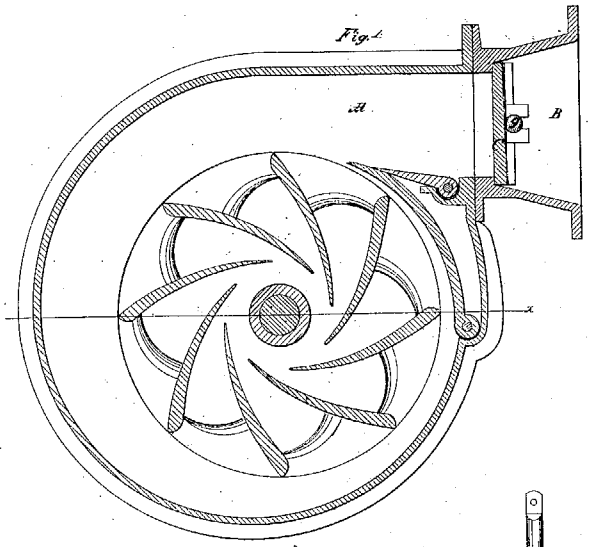

Figure 4 a horizontal section in the line *y y* of figs. 2 and 3.

Similar letters indicate like parts in each of the drawings.

Water-wheels which work within the ordinary scroll-shaped water-ways are constantly liable to injury from pieces of wood, or other hard substances, that may be carried into said water-ways, which liability to injury I have perfectly remedied by my present improvement.

In my present improved water-wheel, a section, *k*, of the terminal portion of the curb is hinged to the main portion of said curb, and my present improvement consists in so proportioning and hinging a section, *m*, of the inner face of the mouth of the scroll-shaped water-way of the wheel that the said hinged section *m* will bear against the outer surface of the hinged curb-section *k*, and with such a degree of leverage that the pressure of the water, as it passes into the wheel, will, by its action on the said hinged section *m*, keep the curb-section *k* in the closed position shown in fig. 4, under all circumstances of mere water-pressure, and whenever any solid material may pass into the wheel, and be brought in contact with the curb-section *k*, the said section will instantly open for the discharge of said obstruction, and will then be as instantly closed again by the action thereupon of the hinged section *m*.

I do not propose to limit myself to any precise proportions of the above-mentioned hinged sections *k* and *m*, whilst the proportions of said sections shall be such that the lateral pressure of the water, as it passes into the wheel, shall cause the hinged section *m* to retain the hinged section *k* in a closed position under ordinary circumstances, and instantly close the same again after it has been opened by any extraordinary internal pressure.

Having thus fully described my improved water-wheel, what I claim therein as new, and desire to secure by Letters Patent, is—

The hinged section *m* of the inner face of the scroll-shaped water-way of said wheel, when arranged and operating in conjunction with the movable curb-section *k* thereof, substantially in the manner herein set forth.

JOHN TYLER.

Witnesses:

J. D. HORLEY,

M. J. BURTON.